Patented Oct. 31, 1922.

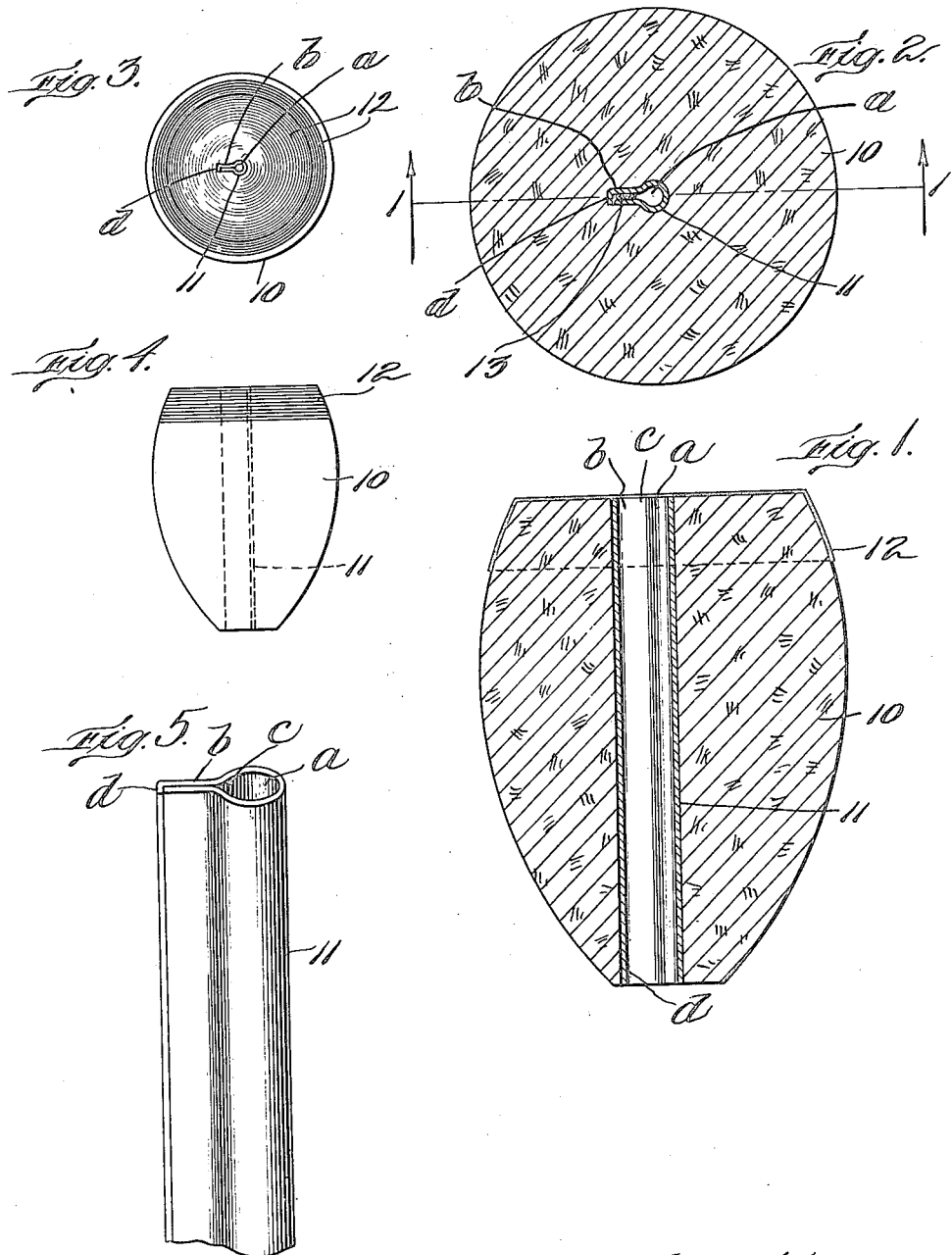

1,434,335

UNITED STATES PATENT OFFICE.

JOHN A. FROST, OF DORCHESTER, MASSACHUSETTS, ASSIGNOR OF ONE-HALF TO HERBERT D. CHADWICK, OF CONCORD, NEW HAMPSHIRE.

FISHERMAN'S BOB.

Application filed November 25, 1919. Serial No. 340,552.

*To all whom it may concern:*

Be it known that I, JOHN A. FROST, a citizen of the United States, residing at Dorchester, in the county of Suffolk and State of Massachusetts, have invented certain new and useful Improvements in Fishermen's Bobs, of which the following is a specification.

This invention relates to improvements in fishermen's bobs. More particularly the invention relates to floats used when fishing with a rod, and has for its object the production of a float which can be quickly and easily adjusted in position on the line; whose grip is central, and is so durable as to withstand an indefinite number of such adjustments; and which is so simple in its construction as to be both inexpensive of manufacture and not breakable by any ordinary treatment or mistreatment. It is another object of the invention to provide a bob with means by which the pull of a fish upon the line can be detected in the dark before the pull is transmitted through the line to the rod.

To these ends, the invention provides a core for the bob comprising a hollow metallic slip-and-grip combination through one part of which the line may pass freely, and through another part of which the line when passing is engaged by friction so tightly that the bob is held stationary and rigid on the line. The gripping portion is preferably set on the axis of the bob, which may be of any ordinary or suitable shape. This core is rigidly embedded in the float, is so small and light as not to affect its buoyancy materially, and yet furnishes a line gripping surface which is immune to wear when the line is repeatedly thrust in and out, does not injure the line, and does not, as do some devices heretofore proposed for the purpose of obtaining a metallic grip on the line, have over balancing parts that protrude up and down above the top and below the bottom of the float, causing more or less disturbance at the surface of the water. A further object of the invention to provide for the fisherman's immediate perception of the pull of a fish has relation to the fact that by virtue of the simple axial line-grip the float can maintain in the water a position with its axis vertical. Being in this position, the top part of the float is above the surface of the water, and is not exposed to the view of any fish that may be in the water, and is coated with a luminous material. The night fisherman then sees a spot of light, whose disappearance indicates a pull on the line from below. The device meanwhile is safe as regards distracting fish from the bait, or as regards scaring them away from the vicinity, because the vertical hanging of the float keeps the luminous surface out of view from the water.

The invention can be applied in various ways and it is intended that the patent shall cover, by suitable expression in the appended claims, whatever features of patentable novelty exist in the invention disclosed.

An embodiment of the invention is illustrated in the accompanying drawing, in which:

Figure 1 is a side elevation in medial section, on the line 1—1 of Figure 2, of a float or bob;

Figure 2 is a plan in section at the place of greatest diameter of the device shown in Figure 1;

Figure 3 is a plan showing the top of such a bob on a smaller scale;

Figure 4 is a side elevation of the device shown in Figure 3; and

Figure 5 is a perspective view of a detail.

Referring to the drawings, 10 indicates a body of cork or other buoyant material which may preferably have a prolate ovoid shape as indicated, with flat top and bottom, but which, of course, may vary greatly in shape. As shown, the top plane surface is somewhat larger than the bottom. A metallic piece 11 of the shape seen in Figure 5 passes medially vertically through this body.

This comprises a tubular portion *a* large enough for the line to slip easily through it and a compressive lip portion *b*. It is made from a single sheet of metal, folded upon itself so that its opposite edges come together and lie next to each other for a little distance to form the lips *b* while the loop portion thus folded is left large enough and preferably circular, in general shape, to receive the line loosely. The place *c* where the metal curves through a reverse bend from the loop *a* to the lips *b* forms a contracting throat into which the line 13 (Figure 2) enters when drawn that way from the loop, thereby spreading the lips apart against the spring tension of the metal supplemented by the elastic backing afforded by the body of cork. Because of the presence of this elastic cork backing, the metallic sheet may be made of thin stock and need not be so delicately tempered, but will retain its springy action and its grip on the line under circumstances in which it would fail if it were unsupported by the cork. To provide this construction, a hole may be drilled vertically through the cork in the place where the loop is to go, the cork being suitably held, preferably under compression for the purpose, and then a small saw cut extending one side of this hole a short distance provides a completed opening through the midst of the cork through which the metal piece can be forced endwise.

When the combination has thus been completed, the metal constitutes a lining for the cork such that the cord of the fish line never rubs against the cork, and does not break off small pieces of the cork as such a cord always does when the cork is unprotected; even when it is pinched tightly in the contracting throat, or between the lips $b$. The metal may be held in place by glue, if desired, although experience thus far indicates that friction alone may be sufficient.

When a line has been threaded through the bob thus made, and is cast into the water with the small end of the bob downward, the weight of the immersed portion of the line and the hook and sinker which it carries holds the bob with its axis approximately vertical and with the portion which is covered by the heavy line 12 in Figure 4 out of water and facing upward. This line indicates a coating of luminous material, the side portion of which is also indicated by the shading of lines in Figures 3 and 4. This luminosity, therefore, is so arranged as not to be visible under the surface of the water when the bob is afloat, but to be visible to the fisherman; but when drawn under the water the small angle at which the fisherman's line of vision strikes the surface of the water is too small, and the distance to great, for the relatively small luminosity to come through the surface of the liquid, so that it disappears from view, thereby giving to him the awaited signal without the luminosity having been a disturbing influence in the neighborhood of the bait while it was on the surface.

The core lining may preferably be arranged so that the lips $b$, or at least the contracting throat $c$, are about on the line of the axis of the ovoid body of cork, so that when in use the line 13 will be on the axis. This part of the apparatus, however, has such small diameter relative to the total diameter that the bob will stand satisfactorily even when the loop portion $a$ is on the axis. Figure 6 illustrates the construction which is preferred in this respect; and it can easily be seen from the other figures that the placing of the core grip somewhat eccentrically does not make much difference. It will be understood that the size of the core is exaggerated in the drawings for clearness of showing. Another feature which may be added as a measure of safety and durability is the terminal flange $d$ which, as clearly shown in Figure 5, is formed by bending one of the lips $b$ at right angles so as to overlap the end of the other lip $b$. This will prevent anyone from pulling the line 13 so hard between the lips as to pull it out into the soft cork adjacent. Figure 2 illustrates its use thus as a barrier when the lips $b$ are spread.

I claim as my invention:—

1. A fisherman's bob comprising a float having through it a passage for the line, combined with a lining having portions side by side and communicating, one of which is adapted to slip the line easily, and the other of which is adapted to hold the line frictionally.

2. A fisherman's bob comprising a float having through it a passage for the line, the walls of the passage being elastically pressed together and having a wear resisting lining constituting elastic jaws, of a clamp adapted to hold the line and having its entrance permanently open to receive or release it.

3. A fisherman's bob comprising a float of buoyant solid material having through it a passage for the line and a lining of sheet material therefor formed with a fold, constituting a loop for easy passage of the line and lips for holding the line, opening of the lips being resisted by the solid material of the float.

4. A fisherman's bob comprising a prolate float, having a hole for the line extending along its major axis, provided with walls adapted to grip the line compressively and to let slip the line, said adaptations being each continuous, in point of time, and both existing at the same time.

5. A fisherman's bob comprising a prolate float, having a hole for the line extending along its major axis, provided with walls adapted both to grip the line compressively and to let slip the line; combined with luminous material coating one end portion of the said float.

6. A fisherman's bob comprising a float; means to maintain it on the line with a predetermined portion of the float out of the water and facing upward and near the surface of the water, so that a slight down pull will submerge that portion and thereby render that portion invisible to the fisherman; combined with luminous material coating said upward facing portion and arranged facing only upward so as to be invisible at all times from the under side of the water.

7. A fisherman's bob comprising a float having through it a passage for the line, combined with a lining for the passage adapted in one place to let the line slip easily, in another to spread elastically and so to hold the line frictionally, and having a barrier at the end of the spreadable portion to prevent the escape of the line from being contained by the lining when the lips are spread.

Signed at Boston, Massachusetts, this 20th day of November, 1919.

JOHN A. FROST. [L. S.]